US007322273B2

(12) United States Patent
Rafn

(10) Patent No.: US 7,322,273 B2
(45) Date of Patent: Jan. 29, 2008

(54) PISTON-PISTON ROD RETAINING ASSEMBLY FOR A HYDRAULIC PISTON AND CYLINDER UNIT

(75) Inventor: Mark Rafn, Two Harbors, MN (US)

(73) Assignee: The Stanley Works, New Britain, CT (US)

( * ) Notice: Subject to any disclaimer, the term of this patent is extended or adjusted under 35 U.S.C. 154(b) by 91 days.

(21) Appl. No.: 10/917,410

(22) Filed: Aug. 13, 2004

(65) Prior Publication Data

US 2006/0032369 A1 Feb. 16, 2006

(51) Int. Cl.
*F16J 1/12* (2006.01)
*F16B 39/34* (2006.01)

(52) U.S. Cl. ........................................ 92/256; 411/303

(58) Field of Classification Search .................. 92/255, 92/256; 411/303

See application file for complete search history.

(56) References Cited

U.S. PATENT DOCUMENTS 2,348,308 A * 5/1944 Richardson ................. 411/303
2,502,642 A * 4/1950 Currlin ....................... 411/303
3,004,574 A 10/1961 Flick et al.
3,316,952 A 5/1967 Hollinger
3,479,714 A 11/1969 Allsop
3,554,094 A 1/1971 Gross
3,572,414 A * 3/1971 Onufer ....................... 411/372
3,630,252 A 12/1971 Rosan, Sr. et al.
3,737,355 A 6/1973 Epstein et al.
3,835,906 A 9/1974 Dietlein
4,024,802 A 5/1977 Koppa
4,086,946 A 5/1978 Keen
4,185,539 A 1/1980 Stratienko
4,210,372 A 7/1980 McGee et al.
4,437,674 A 3/1984 Fling
4,443,017 A 4/1984 Knott
4,498,826 A 2/1985 Simmonds
4,588,163 A 5/1986 Christensen
4,602,791 A 7/1986 Zöllner
4,688,808 A 8/1987 Iijima (Continued)

OTHER PUBLICATIONS

Cylinder Assembly Drawing, LaBounty Manufacturing, Inc., Drawing No. 301202, sheet 1 of 1, Aug. 9, 1988.

*Primary Examiner*—F. Daniel Lopez
(74) *Attorney, Agent, or Firm*—Pillsbury Winthrop Shaw Pittman LLP

(57) ABSTRACT

A hydraulic piston and cylinder unit comprising the combination of a cylinder assembly defining a cylindrical chamber, a piston member mounted in the cylindrical chamber for reciprocating movement therein in response to movement of hydraulic fluid under pressure into and out of the chamber, and a piston rod member connected to the piston member for movement therewith and extending from one end of cylinder assembly. The members have meshing threads thereon configured to be meshingly interengaged when the members are rotationally moved into an assembled position relative to one another in one direction. The combination also includes a retaining ring including deformable material configured and positioned with respect to one of the members and with respect to the threads of another of the members such that when the members are moved in the one rotational direction into the assembled position, the threads of the other member are moved into the material of the retaining ring to deform the same and thereby resist relative rotational movement between the members in the opposite direction.

28 Claims, 3 Drawing Sheets

U.S. PATENT DOCUMENTS

| | | | | | |
|---|---|---|---|---|---|
| 4,782,740 | A | * | 11/1988 | Fagin et al. | 92/255 |
| 4,807,351 | A | | 2/1989 | Berg et al. | |
| 4,907,924 | A | * | 3/1990 | Hellon | 411/303 |
| 4,917,003 | A | * | 4/1990 | Kollross | 92/256 |
| 5,309,620 | A | | 5/1994 | Shinohara et al. | |
| 6,116,809 | A | | 9/2000 | Raszkowski | |
| 6,139,021 | A | | 10/2000 | Huang | |
| 6,164,659 | A | | 12/2000 | Netzer et al. | |
| 6,170,858 | B1 | | 1/2001 | Berger | |
| 6,275,556 | B1 | | 8/2001 | Kinney et al. | |
| 6,325,383 | B1 | | 12/2001 | Kahle et al. | |
| 6,439,305 | B1 | | 8/2002 | Bakke | |
| 6,711,986 | B2 | | 3/2004 | Angione | |

* cited by examiner

PISTON-PISTON ROD RETAINING ASSEMBLY FOR A HYDRAULIC PISTON AND CYLINDER UNIT

BACKGROUND OF THE INVENTION

1. Field of the Invention

The invention relates to a retaining assembly including a threaded engagement between a piston rod member and a piston member which serves to retain the members together during operation as part of a hydraulic piston and cylinder unit.

2. Background of the Invention

In general, it is known in the art to provide the piston and the piston rod of a hydraulic piston and cylinder unit as separate components that are threaded together by rotational movement during assembly of the piston and cylinder unit. Such a screw-type connection typically is used in lower cost units and/or lower pressure units.

Although such screw-type connection is generally suitable for low-pressure operation, there have been cases in which vibration and repeated operation of the hydraulic piston and cylinder unit has caused the piston to become unscrewed from the piston rod. It will be appreciated that complete separation of the piston from the piston rod can have disastrous consequences. Also, even if the piston only partially unscrews from the piston rod, performance of the hydraulic piston and cylinder unit and the device operatively associated therewith may be adversely affected. There exists a need to provide a screw-type connection of the kind described which does not unscrew in operation and which is cost-effective.

BRIEF SUMMARY OF THE INVENTION

An object of the present invention is to fulfill the need expressed above. In accordance with the principles of the present invention, this objective is obtained by providing a hydraulic piston and cylinder unit which comprises the combination of the following components, namely; a cylinder assembly defining a cylindrical chamber; a piston member mounted in the cylindrical chamber for reciprocating movement therein in response to the movement of hydraulic fluid into and out of the chamber; and a piston rod member connected to the piston member for movement therewith and extending from one end of the cylinder assembly. The members having meshing threads thereon configured to be meshingly interengaged when the members are rotationally moved into an assembled position relative to one another in one direction. The combination also includes a retaining ring including deformable material configured and positioned with respect to one of the members and with respect to the threads of another of the members such that when the members are moved in the one rotational direction into the assembled position, the threads of the other member are moved into the material of the retaining ring to deform the same and thereby resist relative rotational movement between the members in the opposite direction.

Another object of the present invention is to provide a piston and piston rod assembly comprising a piston member and a piston rod member, the members having meshing threads thereon configured to be meshingly interengaged when the members are rotationally moved into an assembled position relative to one another in one direction; and a retaining ring including deformable material configured and positioned with respect to one of the members and with respect to the threads of another of the members such that when the members are moved in the one rotational direction into the assembled position, the threads of the other member are moved into the material of the retaining ring to deform the same and thereby resist relative rotational movement between the members in the opposite direction.

DETAILED DESCRIPTION OF THE INVENTION

Figure 1:
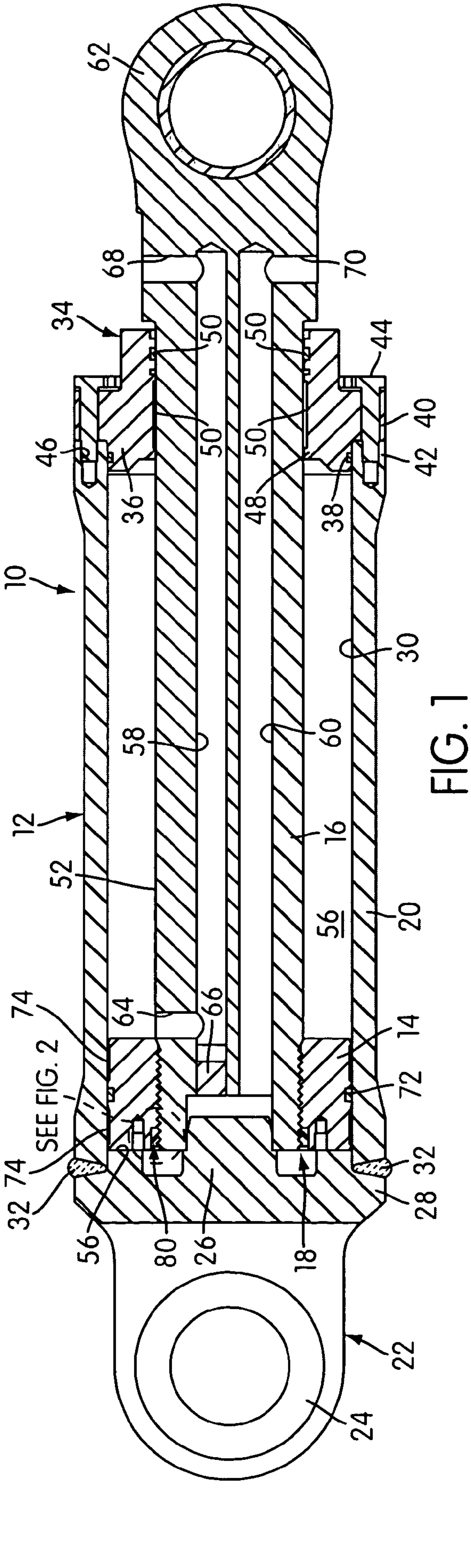
FIG. 1 is a sectional view of a hydraulic piston and cylinder unit embodying the principles of the present invention.

A hydraulic piston and cylinder unit 10 according to the invention is illustrated in FIGS. 1-5. As illustrated in FIG. 1, overall construction of the hydraulic piston and cylinder unit 10 is generally conventional. The unit 10 includes a cylinder assembly 12, a piston member 14, and a piston rod member 16. The present invention is more particularly concerned with a connection or retaining assembly 18 between the piston member 14 and the piston rod member 16.

The cylinder assembly 12 includes a cylinder member 20 having a clevis fitting 22 secured to one end thereof. The clevis fitting 22 includes a pair of generally parallel apertured lugs 24 which are spaced apart in the direction into and out of the plane of the sheet as shown in FIG. 1. The lugs 24 extend from a generally thickened portion 26, and a shoulder 28 extends circumferentially around the thickened portion 26. The outer diameter of the shoulder 28 is sized such that it makes a tight fit with an inner, cylindrical surface 30 of the cylinder member 20 defining a fluid pressure chamber of the unit 10. The clevis fitting 22 is secured to the cylinder member 20 by inserting the shoulder 28 into the open end of the cylinder member 20 and then welding the parts together, with welding flux 32 filling the circumferential gap between the thickened portion 26 of the clevis fitting 22 and the mating end of the cylinder member 20.

A sealing head or gland 34 is secured to the other end of the cylinder member 20 at the opposite end of the cylinder assembly 12. A cylindrical portion 36 of the sealing head 34 has an outer cylindrical surface that is sized to make a sealed fit, as by seal 38, with the inner cylindrical surface 30 of the cylinder member 20. The sealing head 34 has a flange portion 40, the diameter of which is greater than the diameter of the cylindrical portion 36. The diameter of the flange portion 40 may be the same as the outer diameter of thickened, mounting portion 42 at the end of the cylinder member 20, as illustrated in FIG. 1. A series of fasteners 44 are arranged around the circumference of the sealing head 34. The fasteners 44 pass through the flange portion 40 of the sealing head 34 and engage with threaded holes 46 formed in the thickened mounting portion 42 of the cylinder member 20 to securely fasten the sealing head to the end of the cylinder member 20.

The sealing gland 34 includes a throughbore 48 which is grooved to receive annular seals 50 sized to sealingly engage a cylindrical exterior surface 52 of the piston rod member 16. The seals provide a seal for an adjacent end portion 54 of the chamber defined by the cylindrical surface 30 of the cylinder member 20 between the piston member 14 and sealing gland 34. The sliding seal arrangement enables the piston rod member 16 to reciprocate with respect to the cylinder assembly 12.

As shown in FIG. 1, this reciprocating movement is responsive to the passage of hydraulic fluid through the piston rod member 16 into and out of the chamber end portion 54 adjacent the gland 34 as well as an opposite chamber end portion 56 adjacent the clevis fitting 22. However, such passage could be provided through the cylinder assembly 20 or through a combination of both.

As shown in FIG. 1, the piston rod member 16 has a pair of parallel bores 58 and 60 extending from an inner end thereof to an outer end portion of the piston rod member 16 which has a clevis structure 62 thereon. The bore 58 communicates with the chamber end portion 54 through a radial bore 64 spaced from the inner end of the bore 58 sufficiently to allow a plug 66 to be inserted into the inner end of the bore 58 to thereby block communication with the chamber end portion 56. The inner end of bore 60 is not plugged enabling it to communicate with the chamber end portion 56. In the embodiment shown, the outer ends of the bores 58 and 60 communicate with radial bores 68 and 70, respectively, which can be connected separately to a source of hydraulic fluid under pressure.

Figure 4:
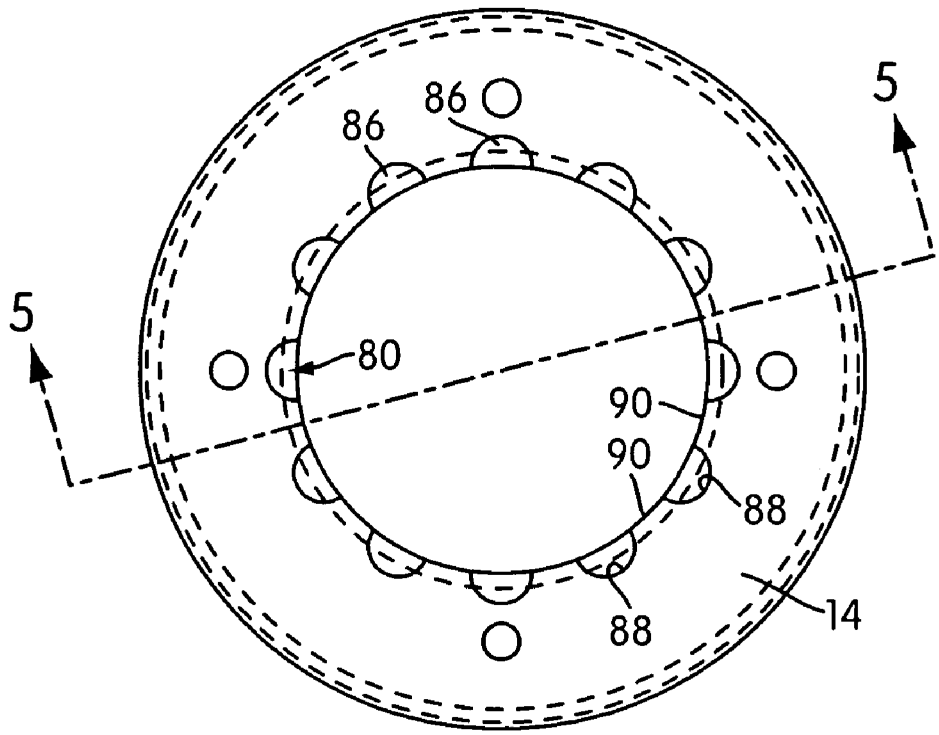
FIG. 4 is an end view of the piston shown in FIGS. 1 and 3.
Figure 5:
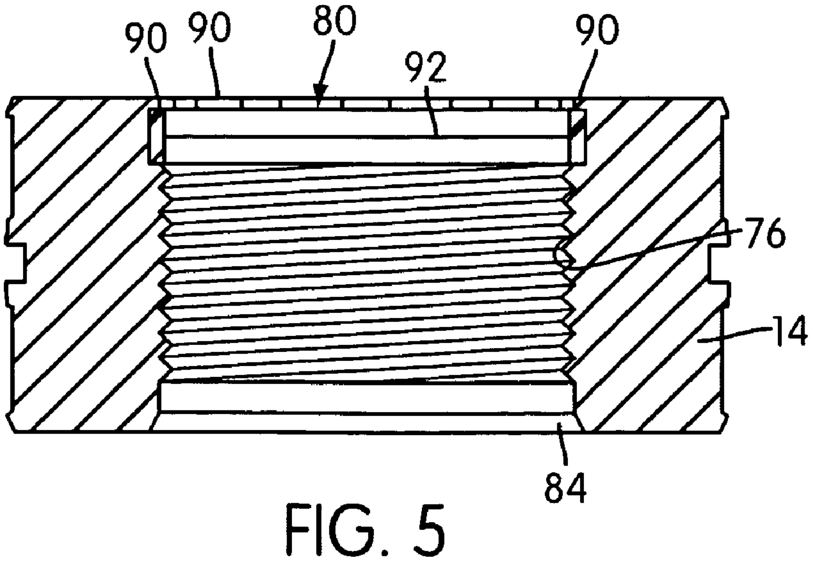
FIG. 5 is a sectional view of the piston shown in FIGS. 1 and 3, taken along lines 5-5 in FIG. 4.

As best shown in FIGS. 1, 4 and 5, the piston member 14 has an annular configuration with an outer cylindrical periphery grooved to receive a central seal 72 and two wear rings 74 disposed on opposite sides thereof. An interior periphery of the piston member 14 has the main central portion thereof formed with internal threads 76 constituting a part of the connection 18 embodying the principles of the present invention. The connection 18 also includes meshing external threads 78 on the inner end of the piston rod member 16 and a retaining ring, generally indicated at 80.

The meshing threads 76 and 78 are configured to be meshingly interengaged when the members 14 and 16 are rotationally moved into an assembled position relative to one another in one direction. When in assembled position, a frusto-conical stop surface 82 adjacent one end of the threads 78 of the piston rod member 16 is disposed in engagement with a mating frusto-conical stop surface 84 adjacent a corresponding end of the threads 76 of the piston member 14. A series of annularly spaced holes 85 are formed in the inner surface of the piston member 14 to receive a correspondingly shaped tool to aid in moving the members into their assembled position.

The interior periphery of the piston member 14 adjacent the opposite end of the threads 76 is configured to receive the retaining ring 80 in fixed relation against movement both rotationally and axially. To this end, the exterior periphery of the retaining ring 80 is formed with a series of annularly spaced convexly curved projections 86 and the adjacent end of the interior periphery of the piston member 14 is formed with a series of annularly spaced recesses 88 of a configuration to meshingly receive the projections 86 therein. The spaced annular portions between the recesses 88 are undercut to provide radially inwardly extending axial movement retaining lugs 90.

The retaining ring 80 is formed of a deformable material which enables the retaining ring to be moved axially inwardly past the lugs 90 so that the lugs 90 serve to fix the retaining ring 80 on the piston member 14 against relative axial movement while the engagement of projections 86 within the mating recesses 88 serve to fix the retaining ring 80 on the piston member 14 against relative rotational movement.

Figure 2:
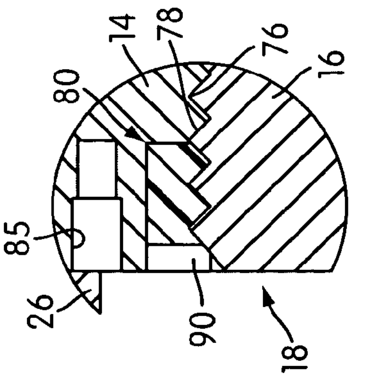
FIG. 2 is an enlarged view of the encircled portion of the retaining assembly view shown in FIG. 1.
Figure 3:
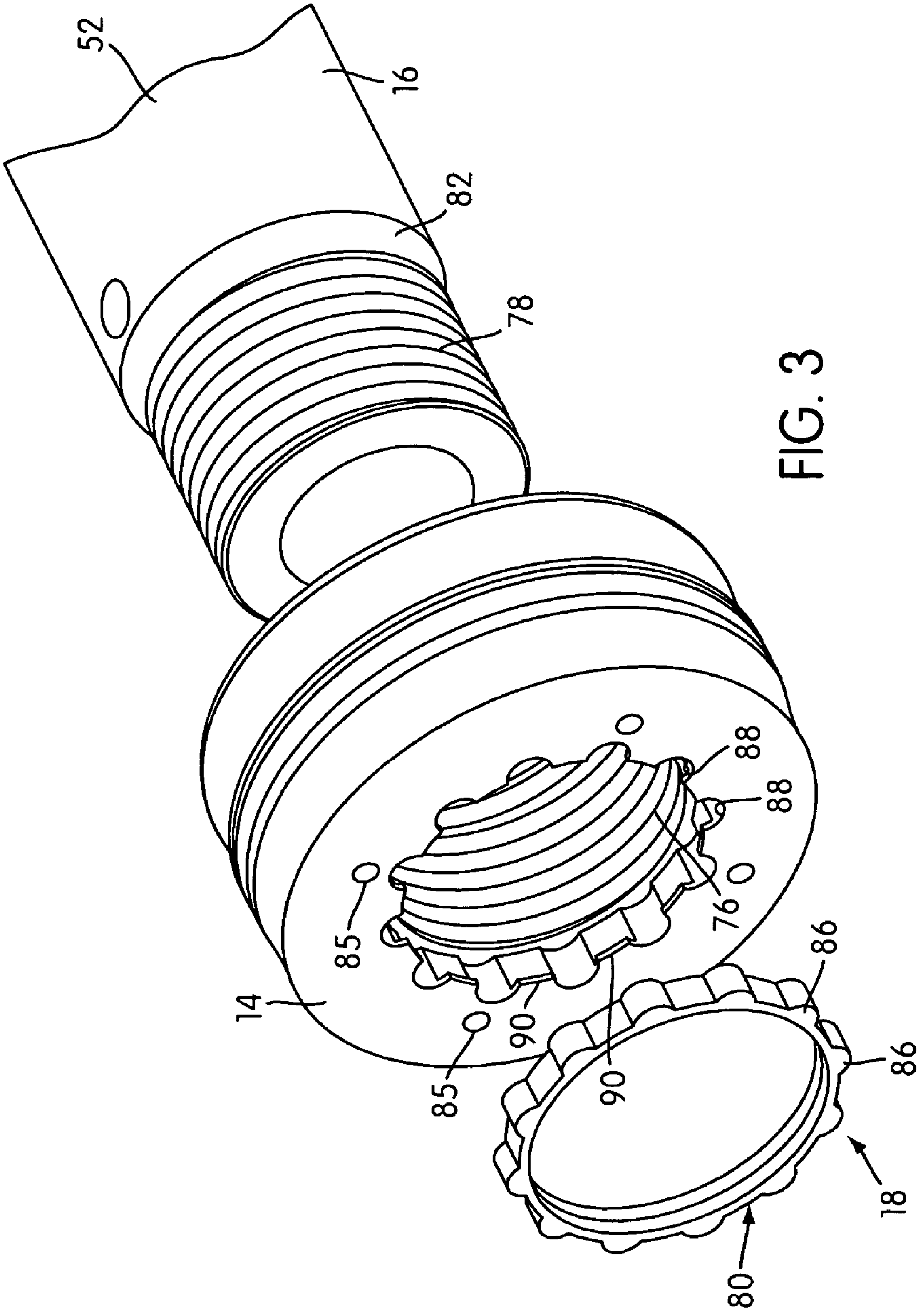
FIG. 3 is an exploded perspective view showing the retaining ring, piston, and a portion of the piston rod of the hydraulic piston and cylinder unit shown in FIG. 1.

When the retaining ring 80 is mounted in the piston member 14 as aforesaid and the piston rod member 16 is relatively rotationally moved into its assembled position with respect to the piston member 14, the configuration and position of the retaining ring 80 with respect to the threads 78 of the piston rod member 16 is such that the threads 78 are moved into the material of the retaining ring 80 to deform the same and thereby resist relative rotational movement between the members 14 and 16 in an unscrewing direction. This deformed condition is best shown in FIG. 2.

The retaining ring 80 is constructed from a material that is softer than the piston rod member 16. Because the retaining ring 80 is relatively soft and somewhat malleable, it can be inserted manually into an operative mounting position by squeezing opposite sides of the retaining ring 80 toward each other slightly in order to be able to position one of the temporarily bulging portions of the ring 80 into position beneath the associated lugs 90 and then "working" the retaining ring 80 circumferentially to bypass the remaining lugs 90. Alternatively, the ring can be moved into operative mounting position with the proper tools and fixtures by a snap-in-action. It will be appreciated that when the retaining ring 80 is in its operative mounting position, the series of annularly spaced projections 86 are seated in the series of annularly spaced recesses 88, and the retaining ring 80 will be captured between the bottom of the recesses 88 and the under surfaces of the lugs 90. Thus, engagement of the projections 86 within the recesses 88 prevents the retaining ring 80 from substantially rotating in either direction and capture of the retaining ring 80 within the recesses 88 by the lugs 90 prevents the retaining ring 80 from substantially moving axially in either direction.

Because the internal diameter of the retaining ring 80 is smaller than the outer diameter of the external threads 78 on the end of the piston rod member 16, and because the retaining ring 80 is constructed of a material that is softer than the interfering threads 78, the retaining ring 80 will deform and mold itself to the shape of the threads 78. That deformation and molding of the retaining ring 80 to the threads 78, as best shown in FIG. 2, provides a very strong interference fit which provides sufficient retentive strength to prevent the piston-piston rod assembly from coming unscrewed during the operation of the hydraulic piston and cylinder unit 10.

In addition to urethane as the preferred material for the ring 80, other materials may be used so long as they do not damage the threads 78 and so long as they provide enough retention to function in operation. Such other materials may include, but are not necessarily limited to, nylon, nitrile, or even metal such as brass or bronze, so long as it can be manipulated into the operative mounting position.

Furthermore, with respect to the configuration of the retaining ring 80, there may be a stepped or sloping decrease in the thickness of the wall of the retaining ring 80 as illustrated at 92 in FIG. 4. A stepped or sloped thickness configuration helps prevent excessive stress from building up in the material of the retaining ring 80 when it is compressed between the containing surfaces of the piston member 14 and the threads 78 of the piston rod member 16 until stop surfaces 82 and 84 are engaged.

Alternatively, although in the disclosed embodiment the projections 86 extend radially outwardly from the retaining ring 80 and engage with the recesses 88 formed in the piston member 14, it is contemplated that the relationship could be reversed, i.e., that the retaining ring 80 could be formed with recesses into which fit projections extending from the member 14 piston. Similarly, the connection 18 itself could be reversed, that is, the retaining ring 80 could be mounted on the piston rod member 16 and engage the threads of the piston member 14. Additionally, while the disclosed embodiment prevents the retaining ring 80 from moving axially or longitudinally in either a forward (distal) or rearward (proximal) direction, it may not be necessary to restrain axial motion in both directions. Movement retention in the forward direction only may be enough.

Finally, while the connection 18 is particularly useful in the hydraulic piston and cylinder unit 10 described above, the connection or retaining assembly 18 may have usefulness in other piston and cylinder applications, as for example, pneumatic or the like, either double or single acting.

These and other departures from the disclosed embodiment will occur to those having skill in the art and are deemed to be within the scope of the following claims.

What is claimed is:

1. A hydraulic piston and cylinder unit comprising:

a cylinder assembly defining a cylindrical chamber;

a piston member mounted in said cylindrical chamber for reciprocating movement therein in response to movement of hydraulic fluid under pressure into and out of said chamber;

a piston rod member connected to said piston member for movement therewith and extending from one end of said cylinder assembly;

said piston rod and piston members having meshing threads thereon configured to be meshingly interengaged when said members are rotationally moved in one direction into an assembled position relative to one another; and a peripheral retainer disposed between and engaging the piston rod member and the piston member to resist relative rotation between the members, the peripheral retainer including deformable material configured and positioned with respect to a first of said members and with respect to the threads of a second of said members such that when said members are moved in said one rotational direction into said assembled position, the threads of said second member are moved into the material of said peripheral retainer to deform the same and thereby form an interference fit to resist relative rotational movement between said members in a direction opposite to said one rotational direction, wherein said peripheral retainer and said first member include interengaging surfaces that prevent substantial relative rotational movement, and wherein the peripheral retainer is removable from the first member.

2. A hydraulic piston and cylinder unit as defined in claim 1, wherein said peripheral retainer is mounted on said first member such that relative axial movement in at least one direction beyond an operatively mounted position is prevented.

3. A hydraulic piston and cylinder unit as defined in claim 2, wherein said peripheral retainer is removably fixed to said first member such that substantial relative axial movement of the peripheral retainer in either direction is prevented.

4. A hydraulic piston and cylinder unit as defined in claim 1, wherein said interengaging surfaces of the peripheral retainer and said first member include a series of annularly spaced interengaging projections and recesses preventing said substantial relative rotational movement.

5. A hydraulic piston and cylinder unit as defined in claim 1, wherein said peripheral retainer is mounted on said first member such that relative axial movement in at least one direction beyond an operatively mounted position is prevented, and wherein said first member includes a lug configured and positioned to engage said peripheral retainer and prevent said axial movement in said one direction beyond said operatively mounted position.

6. A hydraulic piston and cylinder unit as defined in claim 5, wherein the material of said peripheral retainer forms the entirety of said peripheral retainer.

7. A hydraulic piston and cylinder unit as defined in claim 6, wherein the material of said peripheral retainer is urethane.

8. A hydraulic piston and cylinder unit as defined in claim 7, wherein said interengaging surfaces of the peripheral retainer and said first member include a series of annularly spaced interengaging projections and recesses preventing said substantial relative rotational movement, and wherein said first member constitutes said piston member and said series of annularly spaced recesses are formed in said piston member.

9. A hydraulic piston and cylinder unit as defined in claim 1, wherein the material of said peripheral retainer is urethane and forms the entirety of said peripheral retainer.

10. A hydraulic piston and cylinder unit as defined in claim 1, wherein said first member constitutes said piston member.

11. A hydraulic piston and cylinder unit as defined in claim 1, wherein said members include stop surfaces which interengage when said members are moved into said assembled position.

12. A hydraulic piston and cylinder unit as defined in claim 11, wherein said stop surfaces are frusto-conical.

13. A hydraulic piston and cylinder unit as defined in claim 1, wherein the material of said peripheral retainer is plastic and forms the entirety of said peripheral retainer.

14. A hydraulic piston and cylinder unit as defined in claim 13, wherein the plastic is urethane.

15. A piston and piston rod assembly comprising:

a piston member;

a piston rod member;

said members having meshing threads thereon configured to be meshingly interengaged when said members are rotationally moved into an assembled position relative to one another in one direction; and a peripheral retainer disposed between and engaging the piston rod member and the piston member to resist relative rotation between the members, the peripheral retainer including deformable material configured and positioned with respect to a first of said members and with respect to the threads of a second of said members such that when said members are moved in said one rotational direction into said assembled position, the threads of said second member are moved into the material of said peripheral retainer to deform the same and thereby form an interference fit to resist relative rotational movement between said members in the opposite direction, wherein said peripheral retainer and said first member include interengaging surfaces that prevent substantial relative rotational movement, and wherein the peripheral retainer is removable from the first member.

16. A piston and piston rod assembly as defined in claim 15, wherein said peripheral retainer is mounted on said first member such that relative axial movement in at least one direction beyond an operatively mounted position is prevented.

17. A piston and piston rod assembly as defined in claim 15, wherein said interengaging surfaces of said peripheral retainer and said first member include a series of annularly spaced interengaging projections and recesses preventing said substantial relative rotational movement.

18. A piston and piston rod assembly as defined in claim 15, wherein said peripheral retainer is mounted on said first member such that relative axial movement in at least one direction beyond an operatively mounted position is prevented, and wherein said first member includes a lug configured and positioned to engage said peripheral retainer and prevent said axial movement in said one direction beyond said operatively mounted position.

19. A piston and piston rod assembly as defined in claim 18, wherein said interengaging surfaces of said peripheral retainer and said first member include a series of annularly spaced interengaging projections and recesses preventing said substantial relative rotational movement, and wherein said first member constitutes said piston member and said series of annularly spaced recesses are formed in said piston member.

20. A piston and piston rod assembly as defined in claim 15, wherein the material of said peripheral retainer is urethane and forms the entirety of said peripheral retainer.

21. A piston and piston rod assembly as defined in claim 15, wherein said first member constitutes said piston member.

22. A piston and piston rod assembly as defined in claim 15, wherein said members include stop surfaces which interengage when said members are moved into said assembled position.

23. A piston and piston rod assembly as defined in claim 15, wherein the material of said peripheral retainer is plastic and forms the entirety of said peripheral retainer.

24. A hydraulic piston and cylinder unit as defined in claim 23, wherein the plastic is urethane.

25. A method of assembling a piston member and piston rod member comprising:

interengaging a surface of a peripheral retainer with a surface of a first of said members such that substantial relative rotational movement in either direction is prevented, the peripheral retainer comprising deformable material, the peripheral retainer defining an interference fit with threads of a second of said members, wherein interengaging the surface of the peripheral retainer with the surface of the first member comprises moving the peripheral retainer axially past a retaining lug of the first member, the lug preventing movement of the peripheral retainer relative to the first member in one axial direction beyond an operatively mounted position;

threadingly interengaging threads of the piston rod member with mating threads of the piston member such that the threads of the members are in an assembled position; and moving the threads of the second member into the material of said peripheral retainer to deform the same and thereby resist relative rotational movement between said members, the peripheral retainer being disposed between and engaging the piston rod member and the piston member to resist relative rotation between the members.

26. The method of claim 25, wherein, prior to moving the threads of the second member into the material, an annular surface of the peripheral retainer that defines the interference fit with the second member is unthreaded.

27. The method of claim 25, wherein moving the peripheral retainer axially past the retaining lug of the first member comprises deforming the peripheral retainer to facilitate movement of the peripheral retainer axially past the retaining lug.

28. The method of claim 25, wherein the interengaging surfaces of the peripheral retainer and said first member each comprise a series of annularly spaced projections and recesses.

* * * * *